US010077008B2

(12) United States Patent
Wato et al.

(10) Patent No.: US 10,077,008 B2
(45) Date of Patent: Sep. 18, 2018

(54) WINDSHIELD-MOUNTED CAMERA APPARATUS AND ADJUSTER

(71) Applicant: DENSO CORPORATION, Kariya, Aichi-pref. (JP)

(72) Inventors: Koji Wato, Kariya (JP); Toshihisa Nakano, Kariya (JP); Takeshi Kazama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 131 days.

(21) Appl. No.: 15/139,189

(22) Filed: Apr. 26, 2016

(65) Prior Publication Data
US 2016/0318458 A1 Nov. 3, 2016

(30) Foreign Application Priority Data

Apr. 28, 2015 (JP) ................. 2015-092002

(51) Int. Cl.
*H04N 7/18* (2006.01)
*B60R 11/04* (2006.01)
*H04N 5/225* (2006.01)
*B60R 11/00* (2006.01)

(52) U.S. Cl.
CPC ........... *B60R 11/04* (2013.01); *H04N 5/2252* (2013.01); *H04N 5/2257* (2013.01); *B60R 2011/0026* (2013.01); *H04N 5/2254* (2013.01)

(58) Field of Classification Search
CPC ...................................... B60R 11/04
USPC ........................................ 348/148
See application file for complete search history.

(56) References Cited

U.S. PATENT DOCUMENTS

| 5,455,625 | A | * | 10/1995 | Englander | B60R 11/04 348/372 |
| 6,392,218 | B1 | | 5/2002 | Kuehnle | |
| 6,811,330 | B1 | | 11/2004 | Tozawa | |
| 7,062,300 | B1 | * | 6/2006 | Kim, II | B60R 11/0241 379/454 |
| 8,004,425 | B2 | * | 8/2011 | Hoek | G01P 1/08 340/435 |
| 9,596,387 | B2 | | 3/2017 | Achenbach et al. | |
| 9,707,903 | B2 | * | 7/2017 | Rawlings | B60R 11/04 |

(Continued)

FOREIGN PATENT DOCUMENTS

| JP | H11-069211 A | 3/1999 |
| JP | 2003-011723 A | 1/2003 |

(Continued)

*Primary Examiner* — Leron Beck
(74) *Attorney, Agent, or Firm* — Knobbe, Martens, Olson & Bear, LLP

(57) ABSTRACT

A camera apparatus is provided. A bracket is fixed to a windshield of a vehicle. A camera case is fixed to the bracket. A camera module is fixed to the camera case and includes a lens. The camera apparatus detects a position of an object present ahead of the vehicle. The object includes a lane and another vehicle. Information on the object acquired by the camera apparatus is used for at least one of lane departure alarm control, light control, and collision avoidance control. The camera apparatus further includes an adjustment structure for completing adjustment of an inclination angle in a vertical direction of an optical axis of the lens with respect to the windshield by the time when the camera case is completely fixed to the bracket.

8 Claims, 13 Drawing Sheets

(56) References Cited

U.S. PATENT DOCUMENTS

| | | | |
|---|---|---|---|
| 2008/0253606 A1* | 10/2008 | Fujimaki | G08G 1/161 |
| | | | 382/100 |
| 2009/0046149 A1 | 2/2009 | Ohsumi et al. | |
| 2010/0272300 A1* | 10/2010 | Schlitt | B60R 1/12 |
| | | | 381/334 |
| 2013/0241721 A1* | 9/2013 | Armbrust | B60R 16/02 |
| | | | 340/435 |
| 2014/0104427 A1* | 4/2014 | Matori | H04N 5/2251 |
| | | | 348/148 |
| 2014/0247390 A1 | 9/2014 | Ohsumi | |
| 2016/0318457 A1* | 11/2016 | Nakano | B60R 11/04 |
| 2016/0318458 A1* | 11/2016 | Wato | B60R 11/04 |

FOREIGN PATENT DOCUMENTS

| | | |
|---|---|---|
| JP | 2003-048491 A | 2/2003 |
| JP | 2003-335180 A | 11/2003 |
| JP | 2006-193057 A | 7/2006 |
| JP | 2006-321423 A | 11/2006 |
| JP | 2010-244473 A | 10/2010 |
| JP | 2012-056405 A | 3/2012 |
| JP | UM-3175374 U | 5/2012 |
| JP | 2012-144115 A | 8/2012 |
| JP | 2013-230815 A | 11/2013 |

\* cited by examiner

WINDSHIELD-MOUNTED CAMERA APPARATUS AND ADJUSTER

CROSS-REFERENCE TO RELATED APPLICATION

This application is based on and claims the benefit of priority from earlier Japanese Patent Application No. 2015-92002 filed Apr. 28, 2015, the description of which is incorporated herein by reference.

BACKGROUND

Technical Field

The present invention relates to a camera apparatus mounted on the windshield of a vehicle from the vehicle interior side.

Related Art

A camera apparatus is known which is mounted on the windshield of a vehicle from the vehicle interior side. After the camera apparatus is mounted, the inclination angle thereof with respect to the windshield can be adjusted (refer to JP-A-2003-48491).

The camera apparatus disclosed in JP-A-2003-48491 includes a camera body and a bracket fixing the camera body to the windshield. The inclination angle of the camera body is adjusted as described below. A pin stands as a rotation shaft on one side surface of the camera body. The pin penetrates through a through-hole formed in a side surface of the bracket. In addition, a concave portion is formed in the other side surface of the camera body. A screw type pin is inserted in the concave portion as a rotation shaft. The screw type pin is screwed into a screw hole formed in the bracket. That is, due to the two pins, the camera body can be rotated with respect to the bracket. In addition, a thread stands on the under surface of a contact board projecting from the front surface of the camera body. Adjusting the position of the thread in the vertical direction can hold the camera body at a predetermined angle.

The above camera apparatus can be mounted on the windshield of a vehicle at a desired inclination angle. However, since the camera apparatus has a structure by which the inclination angle thereof can be freely adjusted after being attached to the windshield, the manufacturing cost increases.

SUMMARY

An embodiment provides a camera apparatus which is attached to the windshield of a vehicle and can be inexpensively produced.

As an aspect of the embodiment, a camera apparatus is provided which includes at least one bracket, at least one camera case, and at least one camera module. The bracket is fixed to a windshield of a vehicle from a vehicle interior side. The camera case is fixed to the bracket. The camera module is fixed to the camera case and includes a lens. The camera apparatus detects a position of an object present ahead of the vehicle. The object includes a lane and another vehicle. Information on the object acquired by the camera apparatus is used for at least one of lane departure alarm control, light control, and collision avoidance control. The camera apparatus further includes an adjustment structure for completing adjustment of an inclination angle in a vertical direction of an optical axis of the lens with respect to the windshield by the time when the camera case is completely fixed to the bracket.

DETAILED DESCRIPTION OF THE PREFERRED EMBODIMENTS

Figure 1:
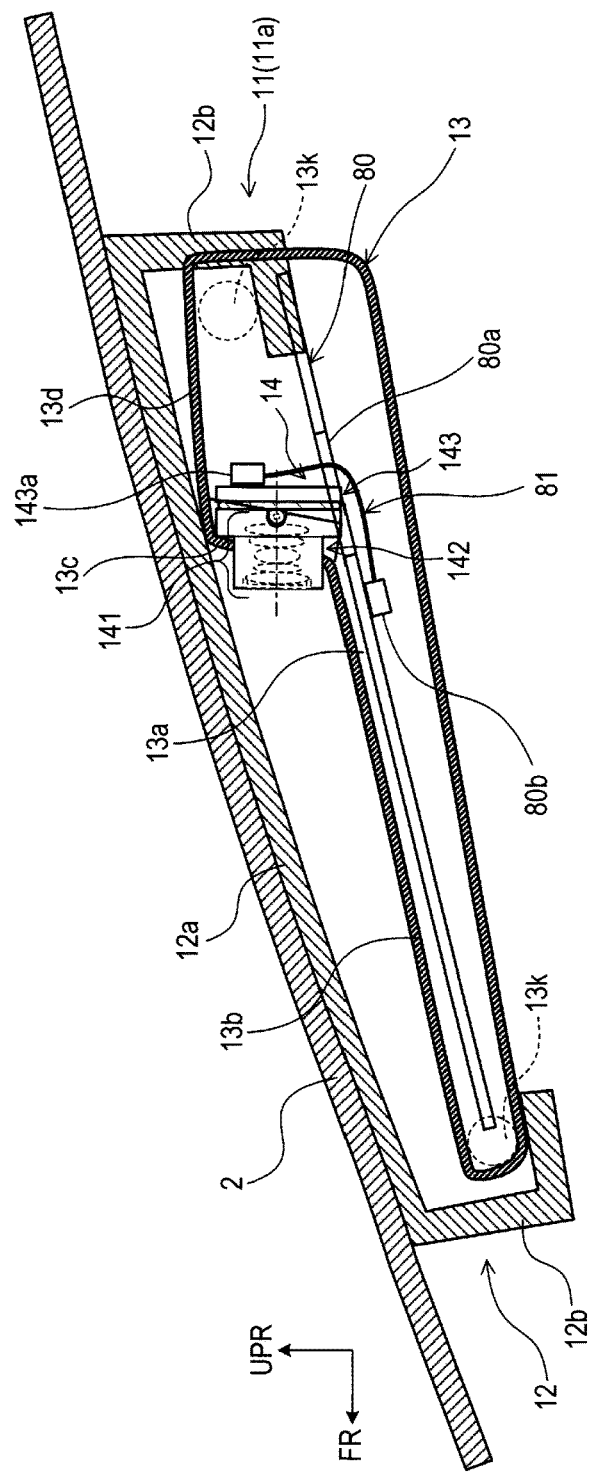
FIG. 1 is a schematic cross-sectional view of a camera apparatus of a first embodiment.

With reference to the accompanying drawings, hereinafter are described embodiments of the present invention. Note that, in the following embodiments, the same reference numerals denote substantially the same parts.

First Embodiment

Configuration

<Structural Configuration of Camera Apparatus>

Figure 2:
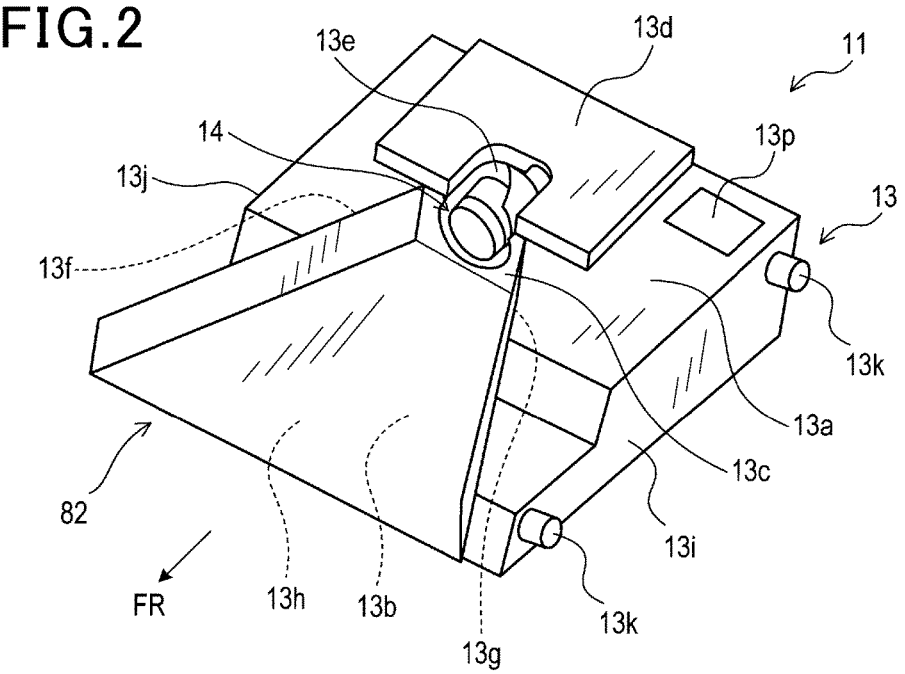
FIG. 2 is a perspective view of the camera apparatus of the first embodiment which does not include a bracket.

A camera apparatus 11 shown in FIG. 1 and FIG. 2 is a so-called monocular camera, and is mounted on a windshield 2 of a vehicle from the vehicle interior side. In FIG. 1, for convenience of explanation, the windshield 2 and a bracket 12 described later are shown by a cross-sectional view on a surface cutting a hooked portion 12b described later of the bracket 12. A camera case 13 is shown with a cross-sectional view on a surface including an optical axis of a camera module 14. The camera module 14 is shown with a side view. Hereinafter, the longitudinal direction, the horizontal direction, and the vertical direction of each of the members of the camera apparatus 11 are defined as the longitudinal direction, the horizontal direction, and the vertical direction of each of the members in a state where the camera apparatus 11 is mounted to the windshield 2 (FIG. 1). That is, according to this definition, the anterior direction of each of the members corresponds to that of the vehicle. In addition, FR, UPR, and RH directions in the figures respectively indicate the front direction, the upper direction, and the right direction.

The camera apparatus 11 includes the bracket 12, the camera case 13, the camera module 14, a signal processing board 80, a connecting line 81, and a hood 82.

The bracket 12 is a metallic or resin member which is fixed to the windshield 2 of the vehicle from the vehicle interior side. In this case, fixing corresponds to positioning. If the bracket 12 is positioned at a specific location, the bracket 12 may be detachably held. The bracket 12 includes a plate-shaped top board 12a and four L-shaped hooked portions 12b. The top board 12a is subject to adhesion to the windshield 2. Two of the four hooked portions 12b stand at one end in the horizontal direction of the under surface of the top board 12a. The other two of the four hooked portions 12b stand at the other end in the horizontal direction of the under surface of the top board 12a.

The camera case 13 is a box-shaped metallic or resin member. The thickness of the camera case 13 decreases in the front direction thereof. The top surface 13a of the camera case 13 includes a plurality of surfaces having different inclination angles. The camera case 13 includes a front planar part 13b, a standing planar part 13c, and a rear planar part 13d, which are three planar parts. The three planar parts intersect with a vertical plane including the optical axis of the camera module 14. The front planar part 13b extends in the longitudinal and horizontal directions. The standing planar part 13c stands in the upper direction from the end of in the posterior direction of the front planar part 13b. The rear planar part 13d extends in the posterior direction from the end in the upper direction of the standing planar part 13c. A hole 13e is formed (see FIG. 2) which exposes the camera module 14 from the middle in the vertical direction of the standing planar part 13c and ahead of the front part of the rear planar part 13d. The front planar part 13b has a trapezoidal shape. At the both sides in the horizontal direction of the front planar part 13b, internal side surfaces 13f and 13g are formed upward. A trapezoidal recess 13h is formed of the front planar part 13b, the internal side surfaces 13f and 13g, and the standing planar part 13c. Note that the recess 13h, the front planar part 13b, and the internal side surfaces 13f and 13g are hidden under the hood 82.

A left external side surface 13i, which is an external side surface of the camera case 13 and is located at the left side of the camera case 13, and a right external side surface 13j, which is an external side surface of the camera case 13 and is located at the right side of the camera case 13, are each provided with two latch parts 13k (a total of four latch parts) cylindrically projecting in the vicinity of the top surface 13a. In FIG. 1, for convenience of explanation, the two latch parts 13k provided at the right side of the camera case 13 are shown in a perspective view. The camera case 13 is fixed to the bracket 12 in a state where the four latch parts 13k are latched onto the respective four hooked portions 12b of the bracket 12.

Figure 3:
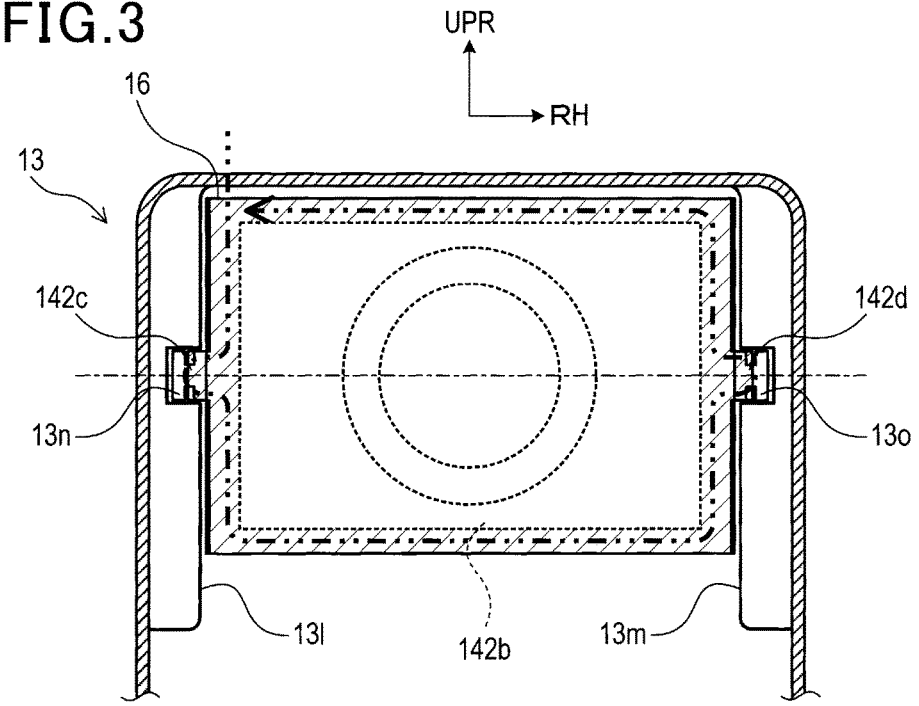
FIG. 3 is an external view of a holder attached to a camera case of the first embodiment.

FIG. 3 is an external view of a holder 142 of the camera module 14 described later attached to the camera case 13, viewed from the rear of the holder 142. As shown in FIG. 3, in a left internal side surface 13l located at the left internal side surface of the camera case 13, a concave portion 13n is formed. In a right internal side surface 13m located at the right internal side surface of the camera case 13, a concave portion 13o is formed. The concave portions 13n and 13o are formed so that the heights (depths) thereof are the same. Projections 142c and 142d described later of the camera module 14 are inserted into the concave portions 13n and 13o.

In addition, as shown in FIG. 2, a label 13p, on which a mark is printed, is pasted (put) on a portion that is on a surface of the camera case 13 and is visible. The mark of the label 13p indicates the type of the inclination angle of the optical axis of lenses 141 of the camera module 14 with respect to the camera case 13 and the type of a shape of the hood 82.

The label 13p will be described in detail. The inclination angle of a windshield differs in, for example, vehicle types. Hence, to direct the optical axis of the lens of a camera apparatus to a predetermined direction with respect to windshields having different inclination angles, plural types of camera apparatuses corresponding to the inclination angles of the windshields are required. In addition, this type of camera apparatus includes a hood shielding light incident from below the lens. The hood is required to have a shape (angle, length and the like) according to the inclination angle and the like of the windshield. In the camera apparatus 11, as described later, the inclination angle of the camera module 14 with respect to the camera case 13 (i.e. the inclination angle of the optical axis of the lenses 141) can be adjusted. Adjusting and fixing the inclination angle of the optical axis of the lenses 141 produces plural types of camera apparatuses depending on the inclination angles of the windshields. The inclination angle of the optical axis of the lenses 141 with respect to the camera case 13 is an inclination angle of the optical axis of the lenses 141 with respect to a reference plane specified with reference to the camera 13. In the present embodiment, the inclination angle of the optical axis of the lenses 141 with respect to the camera case 13 is adjusted in a state where the optical axis of the lenses 141 is positioned on a specific plane perpendicular to the reference plane. The specific plane includes the optical axis of the lenses 141 and is parallel to the vertical direction. The hood 82 of the camera apparatus 11 is one of plural types of hoods having different shapes and produced depending on inclination angles of windshields. The mark of the label 13p indicates the type of the inclination angle of the optical axis of the lenses 141 with respect to the camera case 13 and the type of a shape of the hood 82 of the camera apparatus 11. Specifically, in the present embodiment, inclination angles of the optical axis of the lenses 141 with respect to the camera case 13 are classified into a plurality of types. Identification numbers assigned for the respective types are written on the marks. In addition, identification numbers assigned for the respective shapes of plural types of hoods are written on the marks. These identification numbers are used to identify the type of the inclination angle of the optical axis of the lenses 141 with respect to the camera case 13 and the type of the shape of the hood 82 when the camera apparatus 11 as a product is distributed.

Figure 4:
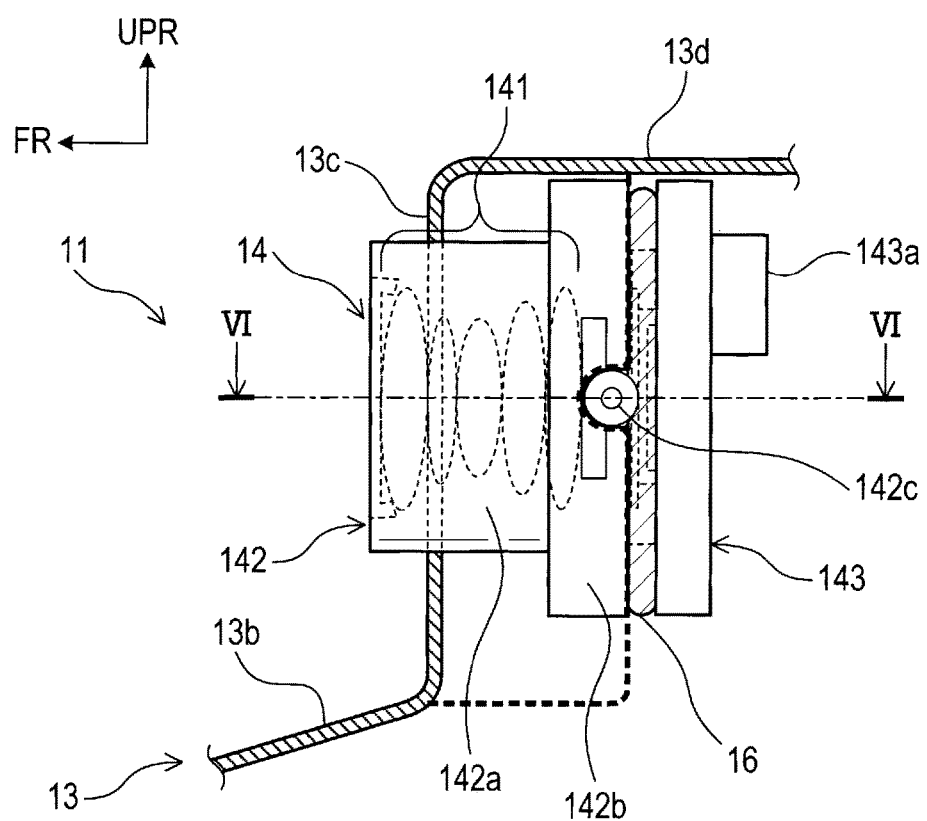
FIG. 4 is a side view of a camera module fixed to the camera case of the first embodiment.
Figure 5:
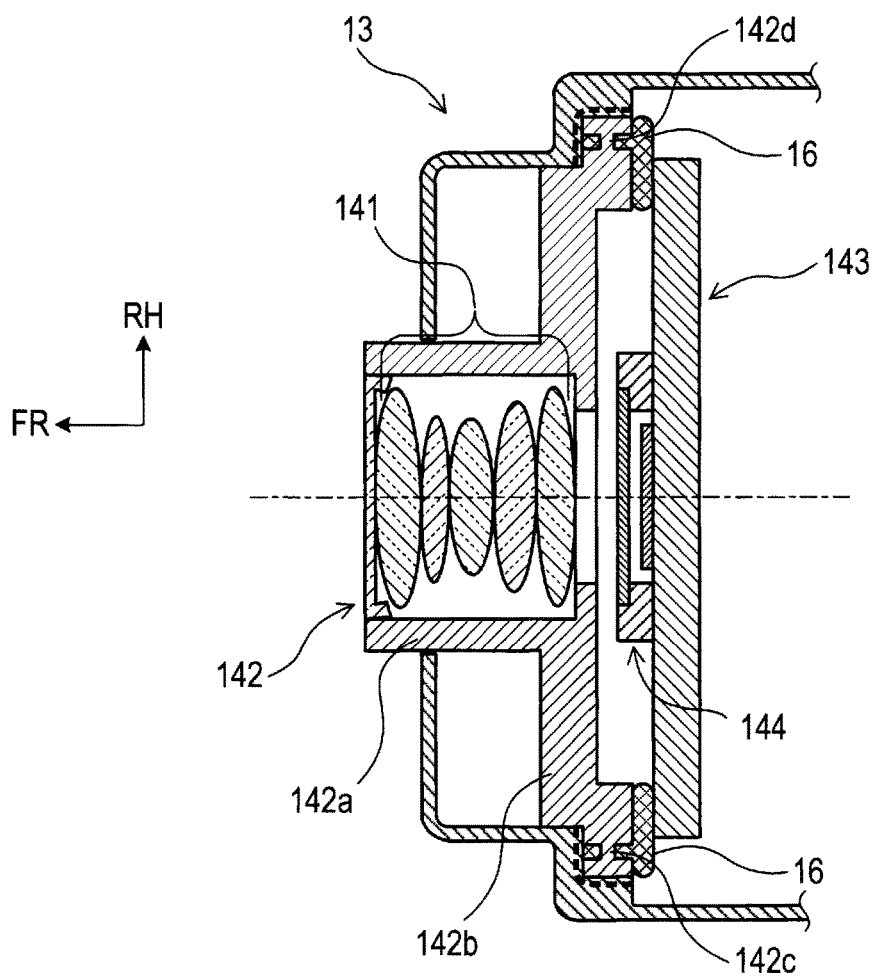
FIG. 5 is a cross-sectional view taken along line VI-VI of FIG. 4.

As shown in FIG. 1, FIG. 4, and FIG. 5, the camera module 14 includes the lenses 141, the holder 142, and a camera board 143.

The holder 142 has a circular cylinder 142a and holds the lenses 141 inside the circular cylinder 142a. The lenses 141 are arranged so that the optical axis thereof agrees with the central axis of the cylinder 142a. In addition, the holder 142 has a base 142*b* having a substantially rectangular plate shape that extends in the direction perpendicular to the central axis from one end portion in the axial direction of the cylinder 142*a*.

As shown in FIG. 3, the projection 142*c* is formed on a left side surface of the base 142*b*, and the projection 142*d* is formed on a right side surface of the base 142*b*. Although the projections 142*c* and 142*d* have substantially cylindrical shapes, an approximately middle portion in the height direction of the cylinder has a diameter smaller than those of other portions and is provided with a recess. The projections 142*c* and 142*d* are respectively inserted into the concave portions 13*n* and 13*o* formed in the camera case 13. As a result, the holder 142 is rotatably held by the camera case 13 in a state where the horizontal axis of the holder 142 serves as a rotation axis. In addition, the adjustable inclination angle of the holder 142 around the horizontal axis with respect to the camera case 13 is fixed by applying an adhesive between the camera case 13 and the holder 142 as described later. Note that the lenses 141 are disposed in the vicinity of the rear planar part 13*d*, which is one of a plurality of surfaces of the top surface 13*a* of the camera case 13 and is close to the windshield 2.

The camera board 143 is a plate-shaped member on which an image sensor 144 (shown in FIG. 5) is mounted, and is attached to the base 142*b* of the holder 142. As shown in FIG. 5, in a state where the camera board 143 is attached to the base 142*b*, the planar parts of the camera board 143 and the base 142*b* come into contact with each other, and the movements of the camera board 143 and the base 142*b* in the direction parallel to the planar parts are not restricted. That is, the camera board 143 and the base 142*b* do not have shapes which are closely fitted to each other and are restricted in movements thereof, but have shapes by which relative position between the camera board 143 and the base 142*b* can be adjusted. As described later, the camera board 143 and the base 142*b* are fixed by using an adhesive in a state where the relative position therebetween has been adjusted. Note that the camera board 143 is provided with a connector 143*a* for connecting the connecting line 81.

The signal processing board 80 shown in FIG. 1 is a plate-shaped member that processes image signals acquired by the camera module 14, and is fixed to the camera case 13 under the camera module 14. The signal processing board 80 and the camera board 143 are disposed so as to cross each other at an angle. The crossing herein means that an imaginary plane parallel to the widest surface of the surfaces of the signal processing board 80 and an imaginary plane parallel to the widest surface of the surfaces of the camera board 143 cross each other. In the present embodiment, the signal processing board 80 and the camera board 143 cross each other at substantially a right angle. In addition, the signal processing board 80 is provided with an opening 80*a* into which part of the camera module 14 is inserted. An end portion at the lower side of the base 142*b* and an end portion at the lower side of the camera board 143 are inserted into the opening 80*a*. In addition, a connector 80*b* for connecting the connecting line 81 is provided on the undersurface of the signal processing board 80. Electrical functions of the camera module 14 and the signal processing board 80 are described later in detail.

The connecting line 81 is connected to the connector 143*a* of the camera board 143 and the connector 80*b* of the signal processing board 80 through the opening 80*a* of the signal processing board 80, and is electrically connected to the camera board 143 and the processing board 80.

The hood 82 is a resin member, and has, as shown in FIG. 2, a trapezoidal bottom wall and a pair of side surfaces standing at the both sides in the horizontal direction of the bottom wall. The hood 82 is fitted into the recess 13*h* and covers the lenses 141 exposed from the hole 13*e* of the camera case 13 from the lower side. The disposition of the hood 82 described above intercepts light incident from the lower side of the lenses 141, and prevents views (e.g. the dashboard of the vehicle) outside the angle of view of the camera module 14 from being projected to the lenses 141.

Next, adjustment of the relative position between the holder 142 and the camera board 143, adjustment of the orientation of the holder 142 around the horizontal axis thereof with respect to the camera case 13, fixation of the holder 142 with the camera board 143, and fixation of the camera case 13 with the holder 142 are described with reference to FIGS. 3 to 6. In the present embodiment, the adjustment and fixation are performed through a series of procedures of an application step of an adhesive, an adjustment step, and a fixing step.

First, in the application step, in a state where the holder 142 is rotatably attached to the camera case 13, an adhesive is uniformly applied in the direction of the arrow shown in FIG. 3 from the rear of the holder 142 to the outer periphery of the holder 142. Thereby, a bonded part 16 is formed which is a layer of the adhesive deposited on the rear of the holder 142. Note that, as shown in FIG. 3 and FIG. 5, the recesses described above are formed in the projections 142*c* and 142*d* of the holder 142. In addition, since inner surfaces of the concave portions 13*n* and 13*o* of the camera case 13 are flat, spaces are provided between the projections 142*c* and 142*d* and the camera case 13. Hence, when the adhesive is applied to the rear of the holder 142, the adhesive is filled between the recesses of the projections 142*c* and 142*d* and the inner surfaces of the concave portions 13*n* and 13*o* of the camera case 13. In this state, before the adhesive is hardened, the camera board 143 is arranged at the rear of the holder 142 to which the adhesive has adhered. That is, the adhesive is applied so that part of the adhesive fixing the holder 142 and the camera case 13 to each other and part of the adhesive fixing the holder 142 and the camera board 143 to each other are connected to each other (see FIG. 5).

Figure 6:
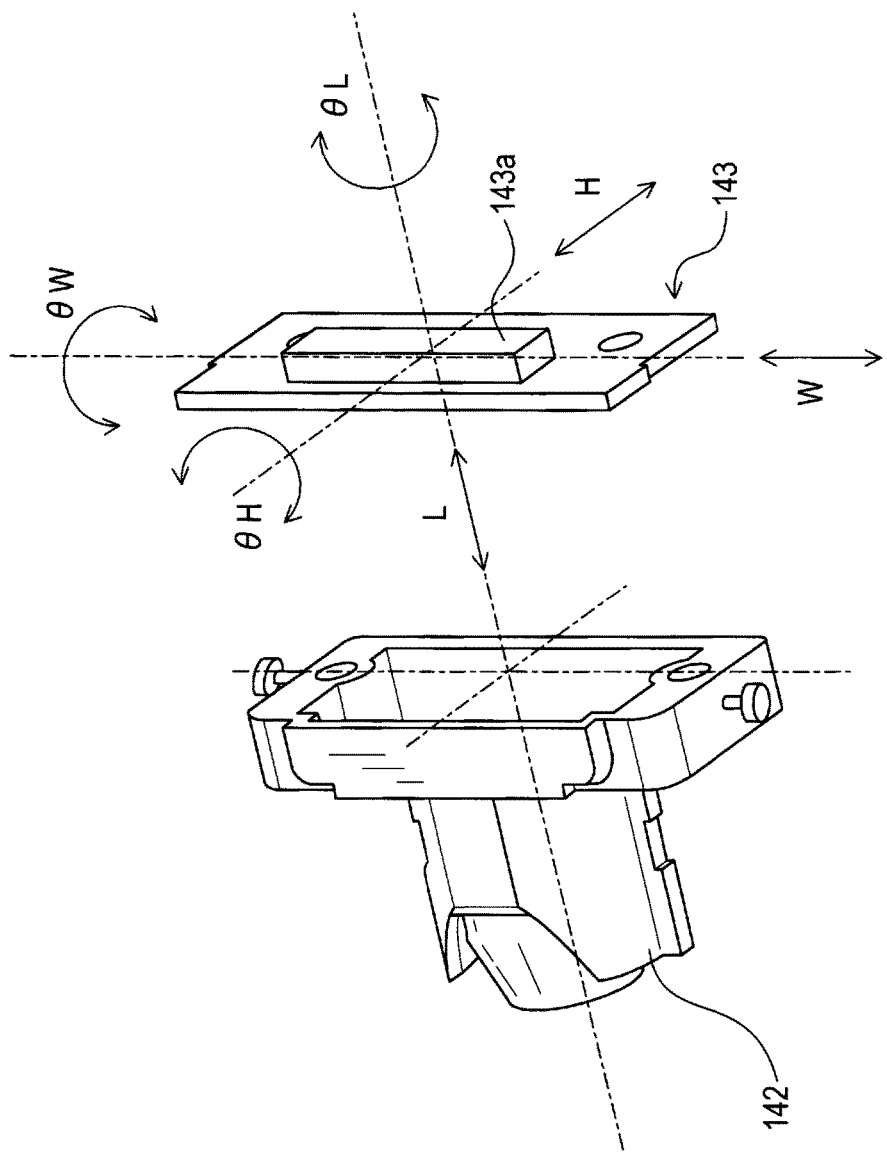
FIG. 6 is an exploded perspective view of the camera module of the first embodiment.

After the application step, the adjustment step is performed. In the adjustment step, in a state where the adhesive has not been hardened, the relative position between the holder 142 and the camera board 143 and the orientation of the holder 142 around the horizontal axis thereof with respect to the camera case 13 are adjusted. The relative position between the holder 142 and the camera board 143 can be adjusted in a state where the holder 142 and the camera board 143 are joined to each other as described. By using this flexibility, as shown in FIG. 6, the relative position of the camera board 143 with respect to the holder 142 can be adjusted with six-axis adjustment. The six-axis adjustment means adjustment by translation in the directions of the x-axis, the y-axis, and the z-axis and rotations around the axes. In addition, in the present embodiment, the relative position is adjusted by changing the shape of the adhesive, such as thickness and spread. Hence, components such as a shim are not used.

Meanwhile, as described above, the orientation around the horizontal axis of the holder 142 with respect to the camera case 13 is adjusted by rotating the holder 142 with respect to the camera case 13. In a state where the camera apparatus 11 is fixed to the vehicle, the angle between the holder 142 and the camera case 13 is adjusted so that an object present ahead of the vehicle is captured within the angle of view of the camera module 14.

After the adjustment step, the fixing step is performed. In the fixing step, hardening the adhesive fixes the holder 142 and the camera board 143 to each other, and fixes the holder 142 and the camera case 13 to each other. In the present embodiment, the adhesive is hardened with time. Specifically, the holder 142 and the camera case 13 are fixed to each other by the hardening of the adhesive filled between the recesses of the projections 142c and 142d of the holder 142 and the inner surfaces of the concave portions 13n and 13o of the camera case 13. Hence, the orientation of the holder 142 around the horizontal axis thereof with respect to the camera case 13 is fixed, and the relative position between the holder 142 and the camera board 143 is fixed.

Figure 7:
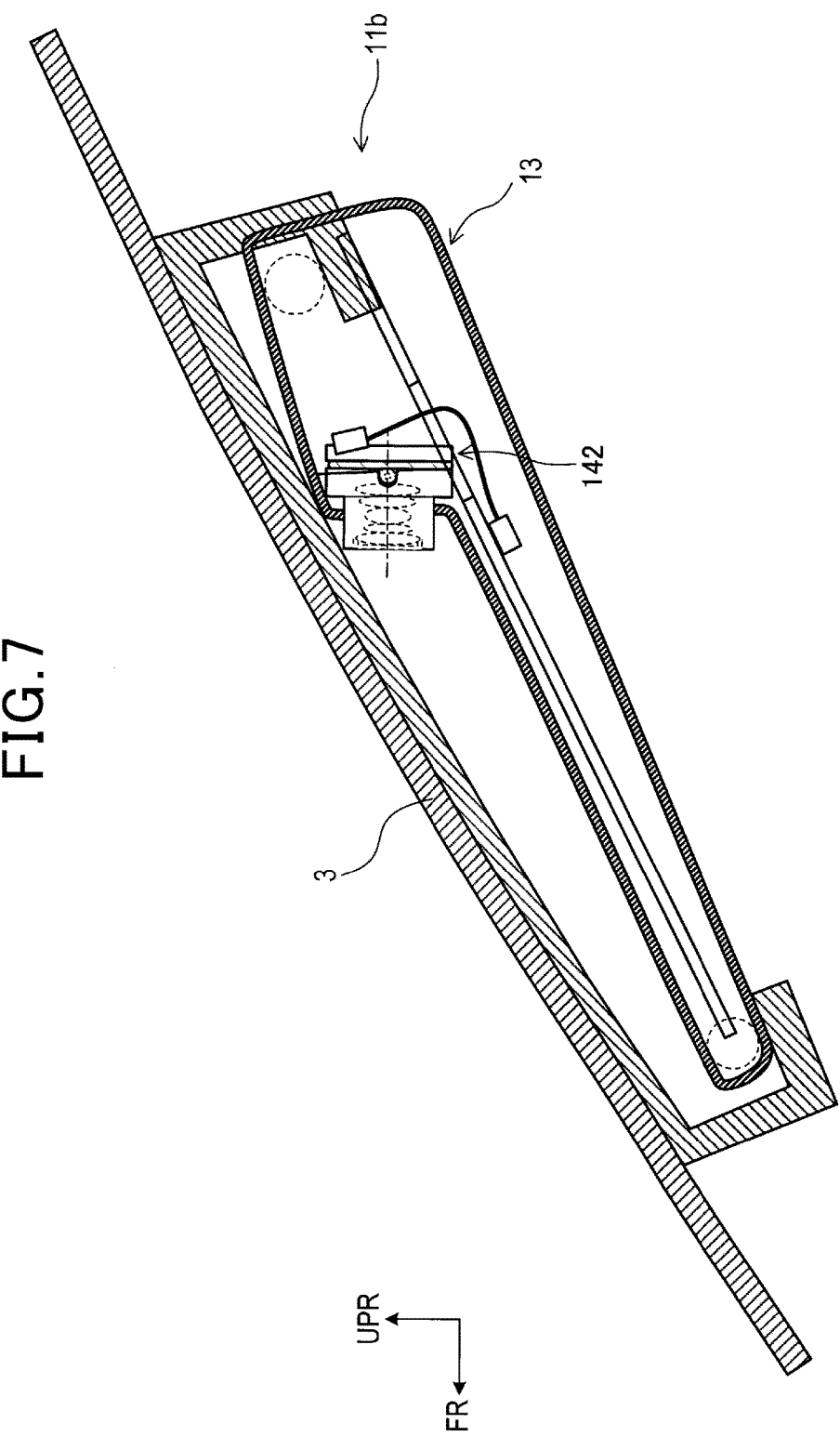
FIG. 7 is a schematic cross-sectional view of a camera apparatus of a modification of the first embodiment.

According to the steps of producing the camera apparatus 11, the camera apparatus can be produced which corresponds to the inclination angle of a windshield, which can differ among vehicle types. That is, by adjusting and fixing the inclination angle of the holder 142 around the horizontal axis with respect to the camera case 13, plural types of camera apparatuses, whose inclination angles of the holder 142 around the horizontal axis with respect to the camera case 13 differ from each other, are produced. For example, in a case of the windshield 2 having a relatively small inclination angle, as shown in FIG. 1, a camera apparatus 11a is mounted in which the inclination angle of the holder 142 around the horizontal axis is fixed. In addition, in a case of a windshield 3 having a relatively large inclination angle (at least larger than the inclination angle of the windshield 2), as shown in FIG. 7, a camera apparatus 11b is mounted in which the inclination angle of the holder 142 around the horizontal axis is fixed so as to be larger than that of the camera apparatus 11a.

<Electrical Functions of Camera Apparatus>

Figure 8:
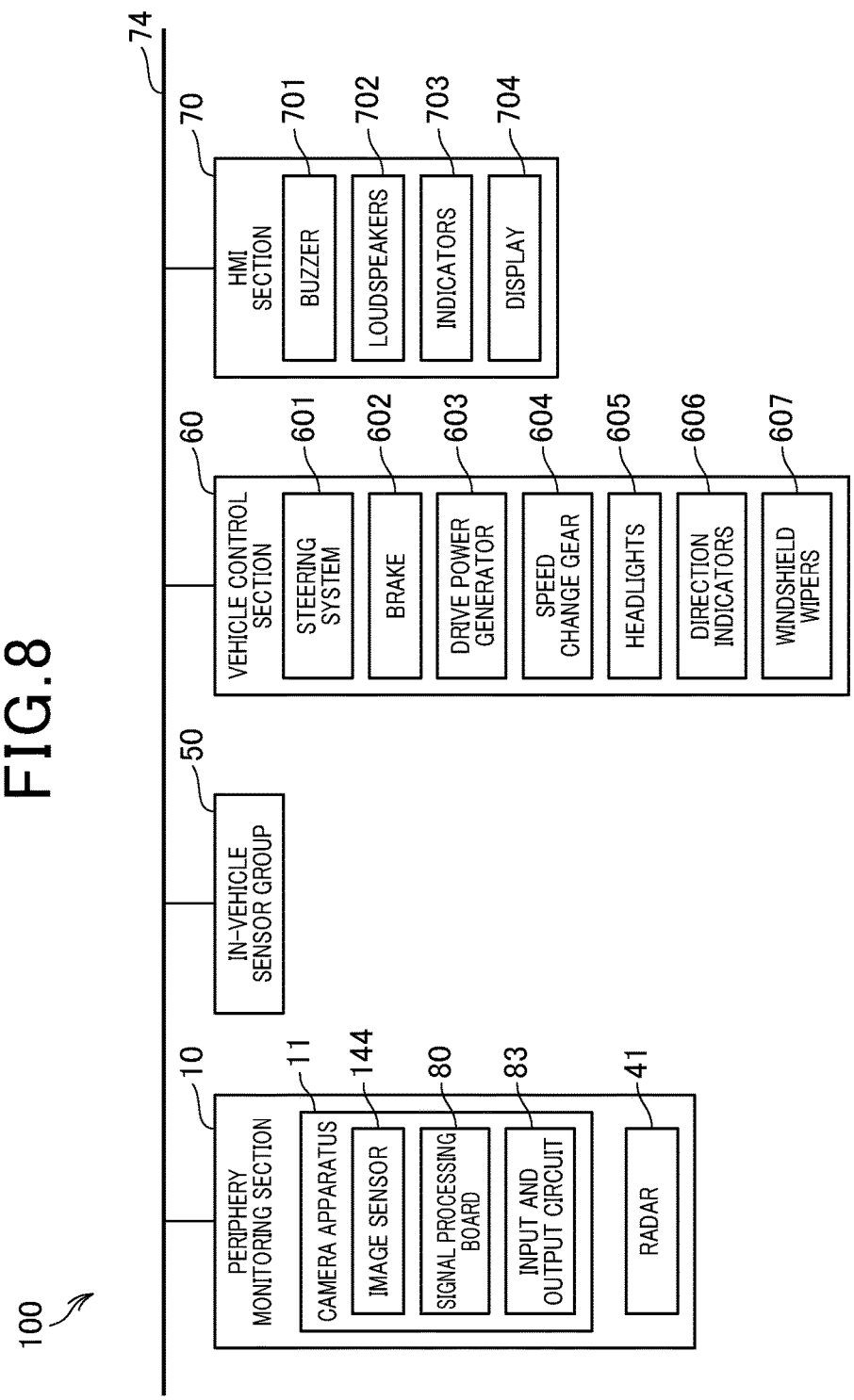
FIG. 8 is a block diagram illustrating a configuration of a vehicle control system of the first embodiment.

Next, electrical functions of the camera apparatus 11 are described with reference to FIG. 8. In FIG. 8, the bracket 12, the hood 82 and the like, which are elements having no electrical functions, of the camera apparatus 11 are not shown. A vehicle control system 100 is installed in the vehicle, and includes a periphery monitoring section 10, an in-vehicle sensor group 50, a vehicle control section 60, and a human-machine interface section (hereinafter, referred to as "HMI section") 70, which are connected to a bus 74 for bidirectional serial communication. Hereinafter, the vehicle including the vehicle control system 100 is referred to as an "own vehicle".

The periphery monitoring section 10 serves as a device for detecting the situation around the own vehicle, and includes the camera apparatus 11 and a radar 41. In addition, the periphery monitoring section 10 may further include a right-side camera, a left-side camera, and a rear camera. The right-side camera is disposed on a side mirror at the right side of the own vehicle, and images a view on the right side of the own vehicle. The left-side camera is disposed on a side mirror at the left side of the own vehicle, and images a view on the left side of the own vehicle. The rear camera is disposed on a rear bumper at the rear side of the own vehicle, and images a view on the rear side of the own vehicle.

The radar 41 is a known type which transmits and receives a radar wave of the millimeter waveband or a laser beam to detect an object that is present within a predetermined search range and has reflected the radar wave. The radar 41 generates object information including at least one of a distance from the own vehicle, relative speed with respect to the own vehicle, and a lateral position with respect to the own vehicle and outputs the object information to the signal processing board 80. Instead of the radar 41, a sonar may be provided which transmits an ultrasonic wave and detects an object by a reflected wave from the object present in the predetermined direction. Note that objects detected by the periphery monitoring section 10 include another vehicle (preceding vehicle, oncoming vehicle, stationary vehicle, and the like), a preceding pedestrian, a preceding object, a stationary pedestrian, a stationary object, an oncoming pedestrian, an oncoming object, a lane, a road sign, and a traffic signal. Note that not all of the objects are required to be detected. At least an object required for performing vehicle control described later is required to be detected.

The camera apparatus 11 includes the image sensor 144, the signal processing board 80, and an input and output circuit 83, functions of which are described later.

The in-vehicle sensor group 50 includes a vehicle sensor, various types of acceleration sensors, and a rudder angle, which detect behaviors of the vehicle. In addition, the in-vehicle sensor group 50 includes a system (e.g. GPS) outputting position data of the vehicle, and a system (e.g. navigation system) that serves as a supply source of map data. In addition, the in-vehicle sensor group includes communication equipment (e.g. road-vehicle communication system, or mobile terminal such as smartphone) and a radar, which are sensors detecting the peripheral environment of the vehicle. In the vehicle, detection results of the sensors are used independently or in combination. Signals may be outputted from the sensors and the like to the bus 74 directly and may be inputted into the vehicle control section 60, the signal processing board 80, and the like from the bus 74. Alternatively, the sensor signals may be inputted into an ECU (e.g. engine ECU) in the vehicle. Thereafter, the sensor signals may be outputted from the ECU to the bus 74 after being processed in the ECU, and then may be received by the vehicle control section 60, the signal processing board 80, and the like via the bus 74.

The vehicle control section 60 includes a steering system 601, a brake 602, a drive power generator 603, a speed change gear 604, headlights 605, direction indictors 606, and windshield wipers 607, which are devices to be controlled of a body system, a power train system, and a chassis system of the own vehicle. The steering system 601 changes the traveling direction of the own vehicle. The brake 602 decelerates the own vehicle and performs energy regeneration. The drive power generator 603 is configured by an engine, a motor, or the like and propels the own vehicle. The speed change gear 604 changes engine speed and torque and transfers drive power. The direction indictors 606 make a sign when the vehicle changes direction or turns right or left. The windshield wipers 607 remove deposits, such as raindrops, snow, and contaminations, on a windshield, when visibility is poor.

The HMI section 70 serves as a device providing an interface for communication between a human and an apparatus, and includes a buzzer 701, loudspeakers 702, an indicator 703, and a display 704, which is a navigation display provided in a center console, a head-up display provided on the center console, or the like. In addition, the HMI section 70 may include a vibration generator (not shown), which is configured by an electric motor or the like and vibrates a steering and seats, and a reaction force generator (not shown), which generates reaction force for the steering and a brake pedal, and may operate the above equipment to transfer information from the apparatus to the human.

The image sensor 144 is an element such as a CCD sensor that converts an image formed by the lenses 141 of the camera module 14 to image data.

The input and output circuit 83 is interposed between the bus 74 and the signal processing board 80, which transmit and receive signals therebetween through the input and output circuit 83. Note that input and output circuit 83 is not shown in FIG. 1 and FIG. 7.

The signal processing board 80 performs image processing of image data outputted from the image sensor 144 to detect an object present within a predetermined imaging range, thereby generating object information including at least the position of the object. The object information may include, in addition to the position of the object, the type of the object, behaviors of the object, the breadth of the object, and the height of the object. In addition, the signal processing board 80 acquires a sensor signal of the own vehicle and object information of the radar 41 from the bus 74, and outputs a signal for controlling actuators (at least one of an actuator in the vehicle control section 60 and an actuator in the HMI section) based on the acquired signal and information and the object information based on the image data. The actuator of the own vehicle performs lane departure alarm control, light control, and collision avoidance control based on the signal from the signal processing board 80. The lane departure alarm control is vehicle control performed based on information on a lane included in the object information. Under the lane departure alarm control, when the own vehicle is likely to depart from the lane, an audible alarm (e.g. buzzer sound or message) is outputted from a sound output section (the buzzer 701 and the loudspeakers 702), which outputs sound, to the driver of the own vehicle. The light control is vehicle control performed based on at least one of the information on the lane included in the object information and the information on another vehicle (e.g. information on tail lamps of a preceding vehicle, and information on headlights of an oncoming vehicle) to control lamps (the headlights 605) installed in the own vehicle. Specifically, the light control is vehicle control including at least one of control for changing the headlights 605 between a high beam and a low beam (i.e. automatic high beam) and control for swiveling the optical axes of the headlights 605. The collision avoidance control is vehicle control performed based on information on various objects included in the object information. Under the collision avoidance control, when the own vehicle and the object ahead of the own vehicle are likely to collide with each other, an object to be controlled, such as the steering system 601 and the brake 602, is controlled which affects the behavior of the own vehicle, to avoid the collision. The actuators of the own vehicle perform, in addition to the vehicle control described above, known vehicle control such as speed alarm control, lane departure prevention control, rear-end collision alarm control, inter-vehicular distance alarm control, sign indication control, all vehicle speed adaptive cruise control (ACC), lane keeping control, lane change accident prevention control, blind spot alarm control, blind spot monitor control, vehicular lane change control, front cross traffic alarm control, rear cross traffic alarm control, stepping error prevention control, and automatic parking control.

[Advantages]

(1) According to the embodiment, the inclination angle of the camera module 14 (holder 142) with respect to the camera case 13 can be adjusted. The inclination angle is fixed by the time when the camera case 13 is completely fixed to the bracket 12. That is, the camera apparatus 11 has a configuration by which the adjustment of the inclination angle in the vertical direction of the optical axis of the lenses 141 of the camera module 14 with respect to the windshield 2 is completed by the time when the camera case 13 is completely fixed to the bracket 12. Since the camera apparatus 11 does not have a configuration for adjusting the inclination angle of the camera module 14 after the camera apparatus 11 is fixed to the bracket 12 (i.e. after the camera apparatus 11 is mounted on the windshield 2), the camera apparatus 11 can be inexpensively produced.

(2) According to the embodiment, after the camera case 13 is completely fixed to the bracket 12, the inclination angle in the vertical direction of the camera module 14 cannot be adjusted. Hence, after the camera case 13 is mounted, the inclination angle of the camera module 14 can be prevented from changing due to, for example, the vibration generated by the traveling of the vehicle.

(3) According to the embodiment, before the inclination angle of the camera module 14 is fixed, the camera module 14 is rotatably held by the camera case 13, whereby the inclination angle of the camera module 14 can be adjusted. Hence, the inclination angle can be adjusted without providing plural types of brackets and camera cases having different shapes. In addition, the inclination angle can be adjusted without using another component such as a shim.

In addition, in the present embodiment, the whole of the camera apparatus 11 is not rotated, but only the camera module 14 is rotated. Hence, compared with a configuration for rotating the whole of the camera apparatus 11 to adjust the angle, the space to be ensured for adjusting the angle in the vehicle can be reduced.

(4) According to the embodiment, in the application step, an adhesive is applied between the holder 142 and the camera board 143, and then between the holder 142 and the camera board 143. In addition, in the adjustment step, the adjustment of the relative position between the holder 142 and the camera board 143, and the adjustment of the orientation of the holder 142 around the horizontal axis thereof with respect to the camera case 13 are performed. In the fixing step, the fixation of the holder 142 with the camera board 143, and the fixation of the holder 142 with the camera case 13 are performed. That is, according to the embodiment, a series of the application step, the adjustment step, and the fixing step perform a step of adjusting and fixing the relative position between the holder 142 and the camera board 143 and a step of adjusting and fixing the orientation of the holder 142 with respect to the camera case 13. Hence, compared with a case where the step of adjusting and fixing the relative position between the holder 142 and the camera board 143 and the step of adjusting and fixing the orientation of the holder 142 with respect to the camera case 13 are separately performed, the number of operations can be decreased.

(5) According to the embodiment, the holder 142 and the camera board 143 have shapes whose relative position can be adjusted in a state where the holder 142 and the camera board 143 are joined to each other, and are fixed to each other with an adhesive. That is, the relative position between the holder 142 and the camera board 143 is adjusted by changing the shape of the adhesive, such as thickness and spread. Hence, the relative position between the holder 142 and the camera board 143 can be adjusted without separately using a component such as a shim.

(6) According to the embodiment, the camera board 143 adheres to the holder 142 by uniformly applying an adhesive from the rear of the holder 142 to the outer periphery of the holder 142. Hence, foreign matter can be prevented from entering between the holder 142 and the camera board 143.

(7) According to the embodiment, a mark indicating the type of the inclination angle of the optical axis of a lens 141 with respect to the camera case 13 and the type of the shape of the hood 82 is put on a portion that is on a surface of the camera case 13 and is externally visible. Although the types of various camera apparatuses corresponding to the inclination angles of windshields are difficult to visually distinguish from each other, putting the marks can visually distinguish the types of various camera apparatuses from each other easily. In addition, according to the present embodiment, merely putting the marks can distinguish, for example, the type of the inclination angle of the optical axis of a lens 141 with respect to the camera case 13. Hence, for example, according to the present embodiment, compared with a configuration for making the identification based on the shape of a component such as the camera case 13, the identification can be inexpensively and easily made.

(8) According to the embodiment, part of the camera module 14 can be inserted into the opening 80a provided in the signal processing board 80. Hence, compared with a configuration in which the opening is not provided in the signal processing board, and the camera module 14 and the signal processing board interfere with each other when the angle of the camera module 14 is adjusted, the range of adjustment of the angle in the vertical direction of the camera module 14 is wider, and the angle is easily adjusted. Hence, the optical axis of the lenses 141 can be easily adjusted.

In addition, as a result of the adjustment of the optical axis of the lenses 141, when the camera module 14 and the signal processing board 80 are close to each other, part of the camera module 14 can be inserted into the opening 80a from the top surface of the signal processing board 80 so as to project toward the under surface opposite to the top surface. Hence, when the optical axis of the lenses 141 is adjusted, the height of the camera apparatus 11 can be prevented from increasing.

Note that, in the present embodiment, the concave portions 13n and 13o formed in the camera case 13 correspond to an example of a rotation holding section.

Second Embodiment

Differences from First Embodiment

In the second embodiment below, since the basic configuration is similar to that of the first embodiment, the description of the configuration common to that of the first embodiment is omitted, and the differences from the first embodiment will be mainly described. The components identical with or similar to those of the first embodiment are given the same reference numerals.

Figure 9:
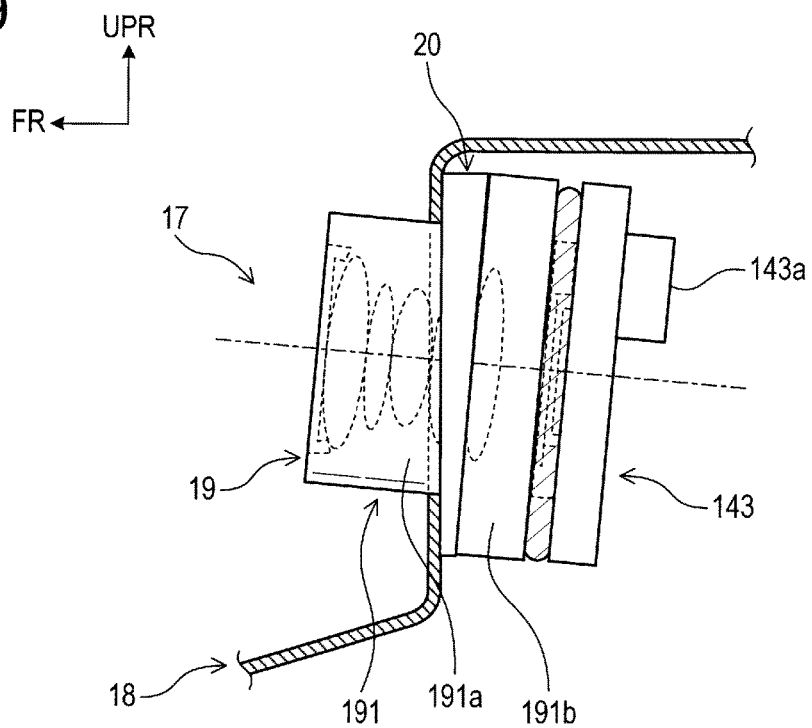
FIG. 9 is a partial enlarged view of a camera apparatus of a second embodiment.

In the camera apparatus 11 of the first embodiment shown in FIG. 4, the camera module 14 is rotated with respect to the camera case 13 to adjust the inclination angle of the optical axis of the lenses 141 with respect to the windshield 2. In contrast, in a camera apparatus 17 of the second embodiment shown in FIG. 9, the inclination angle is adjusted with a shim 20 described later.

Specifically, the camera apparatus 17 of the second embodiment differs from the camera apparatus 11 of the first embodiment in that the camera apparatus 17 includes, instead of the camera case 13 and the camera module 14, a camera case 18 and a camera module 19 having shapes partially different from those of the first embodiment, and further includes the shim 20.

Although the camera case 18 of the second embodiment has a configuration basically similar to that of the camera case 13 of the first embodiment, the camera case 18 differs from the camera case 13 in that the concave portions 13n and 13o of the first embodiment are not provided in the internal side surface thereof. Although the camera module 19 of the second embodiment also has a configuration basically similar to that of the camera module 14 of the first embodiment, the camera module 19 differs from the camera module 14 in that the camera module 19 includes a holder 191 having a shape partially different from that of the first embodiment. The holder 191 has a configuration basically similar to the holder 142 of the first embodiment, and includes a cylinder 191a and a base 191b. However, the holder 191 differs from the holder 142 in that the base 191b does not have projections 142c and 142d of the first embodiment. That is, the camera case 18 and the camera module 19 of the second embodiment do not have a configuration for rotating the camera module 19 (holder 191) with respect to the camera case 18. The camera case 18 and the camera module 19 are fixed to each other by using screws as described later.

The shim 20 is a member for adjusting the inclination angle of the camera module 19 (the optical axis of the lenses 141) with respect to the camera case 18. In a state where the camera apparatus 17 is mounted on the windshield, the shim 20 is provided between the inner surface of the front side of the camera case 18 and the outer surface of the front side of the base 191b of the holder 191. The shim 20 is a member for adjusting the inclination angle of the camera module 19 upward with respect to the camera case 18. The shim 20 has a shape (trapezoid), in which thickness thereof gradually increases upward when viewed in the lateral direction (horizontal direction) in a state where the shim 20 is provided between the camera case 18 and the camera module 19. In the present embodiment, the camera case 18 and the camera module 19 are fixed to each other by using screws in a state where the shim 20 is disposed between the camera case 18 and the camera module 19. In addition, the holder 191 and the camera board 143 described above are fixed to each other with an adhesive as in the case of the first embodiment.

[Advantages]

(1) According to the embodiment, the camera apparatus 17 includes the shim 20 between the inner surface of the front side of the camera case 18 and the outer surface of the front side of the base 191b of the holder 191. Hence, the inclination angle of the camera module 19 with respect to the camera case 18, that is, the inclination angle of the optical axis of the lenses 141 in the vertical direction with respect to the windshield is adjusted. Hence, the angle can be adjusted by using a simple component.

Figure 10:
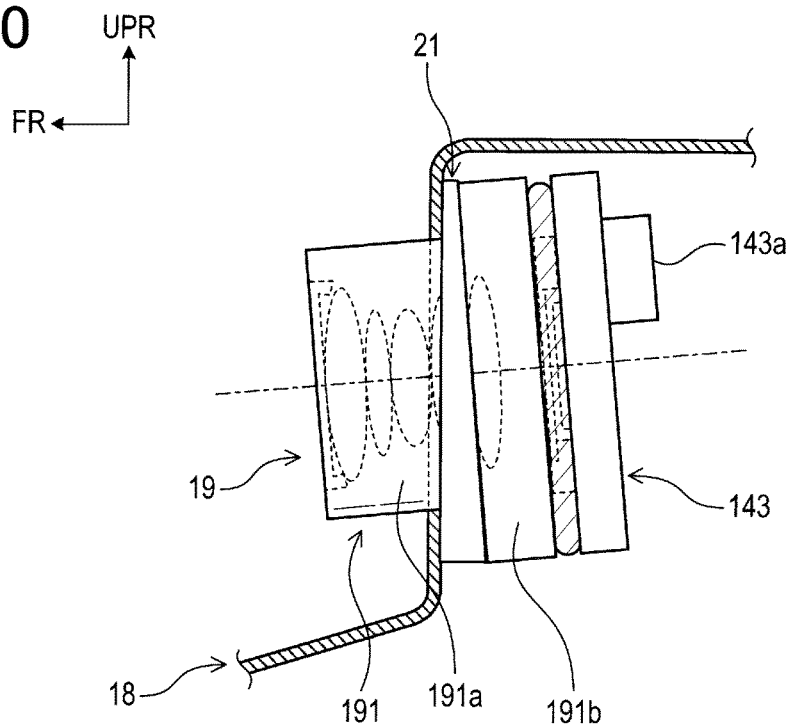
FIG. 10 is a partial enlarged view of a camera apparatus of a modification of the second embodiment.

Note that, in the camera apparatus 17 of the present embodiment, the inclination angle of the camera module 19 is adjusted upward with respect to the camera case 18 by using the shim 20. In contrast, the inclination angle is adjusted downward as shown in FIG. 10. That is, in FIG. 10, a shim 21 is provided between the inner surface of the front side of the camera case 18 and the outer surface of the front side of the base 191b of the holder 191. The shim 21 has a shape in which thickness thereof gradually increases downward when viewed in the lateral direction in a state where the shim 21 is provided between the camera case 18 and the camera module 19. Hence, the inclination angle of the camera module 19 is adjusted downward with respect to the camera case 18. Note that the shim 21 may be a member provided by merely reversing the shim 20 in the vertical direction (i.e. a member having the same shape as that of the shim 20).

Third Embodiment

Differences from First Embodiment

In the third embodiment below, since the basic configuration is similar to that of the first embodiment, the description of the configuration common to that of the first embodiment is omitted, and the differences from the first embodiment will be mainly described. The components identical with or similar to those of the first embodiment are given the same reference numerals.

Figure 11:
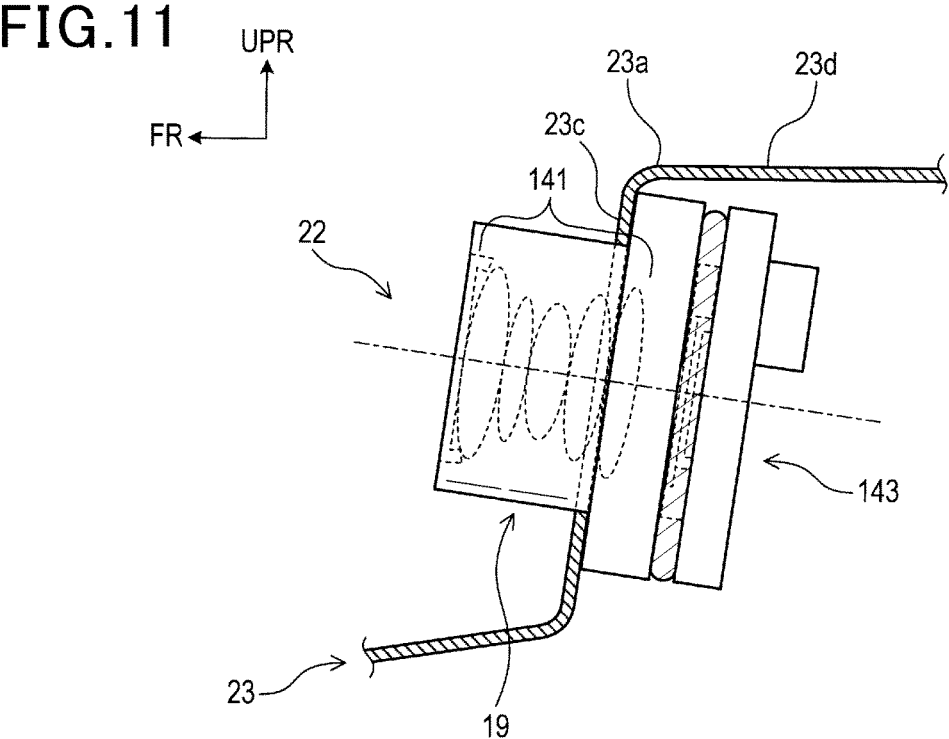
FIG. 11 is a partial enlarged view of a camera apparatus of a third embodiment.

In a camera apparatus 22 of the third embodiment shown in FIG. 11, the inclination angle of the optical axis of the lenses 141 in the vertical direction with respect to the windshield is adjusted with the shape of a camera case 23 described later. The camera case 23 is one of the plural types of camera cases having different shapes. Using appropriate one of the plural types of camera cases having different shapes can adjust the inclination angle. According to the different shapes, the inclination angles of the optical axis of the lenses in the vertical direction with respect to the windshield differ from each other in a state where the camera apparatus is mounted on the windshield.

Specifically, the camera apparatus 22 of the third embodiment differs from the camera apparatus 11 of the first embodiment in that the camera apparatus 22 includes a camera case 23 whose shape is partially different from that of the first embodiment and the camera module 19 of the second embodiment, instead of the camera case 13 and the camera module 14 of the first embodiment.

As in the case of the camera case 18 of the second embodiment, the camera case 23 of the third embodiment does not have the concave portions 13n and 13o of the first embodiment in the internal side surfaces and are fixed to the camera module 19 by using screws.

In addition, in the camera case 23 of the third embodiment, the angle of a wall that contacts an outer surface of the front side of the camera module 19 is different from that of the first embodiment. That is, in the first embodiment, as shown in FIG. 4, in the top surface 13a of the camera case 13, the standing planar part 13c is provided so as to be at a right angle to the rear planar part 13d. In contrast, in the third embodiment, as shown in FIG. 11, a top surface 23a of the camera case 23 includes a standing planar part 23c and a rear planar part 23d. The standing planar part 23c is provided so as to be at an angle larger than a right angle to the rear planar part 23d and to incline to the outside of the camera case 23. Hence, by fixing the camera case 23 to the bracket 12 so that the inclination angle of the rear planar part 23d of the third embodiment is the same as that of the rear planar part 13d of the first embodiment, the inclination angle of the optical axis of the lenses 141 of the camera module 19 with respect to the windshield can be adjusted so as to be larger than that of the first embodiment.

[Advantages]

Figure 12:
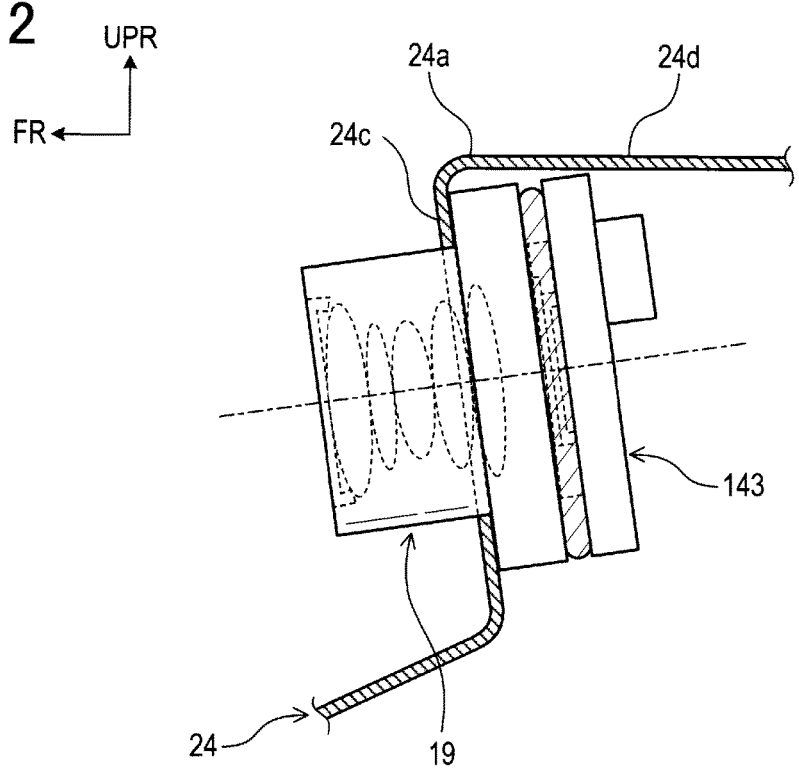
FIG. 12 is a partial enlarged view of a camera apparatus of a modification of the third embodiment.

In the camera apparatus 22 of the third embodiment, the inclination angle of the optical axis of the lenses 141 with respect to the windshield is adjusted so as to be larger than that of the first embodiment. However, the inclination angle of the optical axis of the lenses 141 with respect to the windshield may be adjusted so as to be smaller than that of the first embodiment as shown in FIG. 12. In FIG. 12, instead of the camera case 23, another type of camera case 24 is used. A top surface 24a of the camera case 24 includes a standing planar part 24c and a rear planar part 24d. The standing planar part 24c is provided so as to be at an angle smaller than the right angle to the rear planar part 24d and to incline to the inside of the camera case 24. Hence, by fixing the camera case 24 to the bracket 12 so that the inclination angle of the rear planar part 24d is the same as that of the rear planar part 13d of the first embodiment, the inclination angle of the optical axis of the lenses 141 with respect to the windshield 2 can be adjusted so as to be smaller than that of the first embodiment (and that of the third embodiment).

Fourth Embodiment

Differences from First Embodiment

In the fourth embodiment below, since the basic configuration is similar to that of the first embodiment, the description of the configuration common to that of the first embodiment is omitted, and the differences from the first embodiment will be mainly described. The components identical with or similar to those of the first embodiment are given the same reference numerals.

Figure 13:
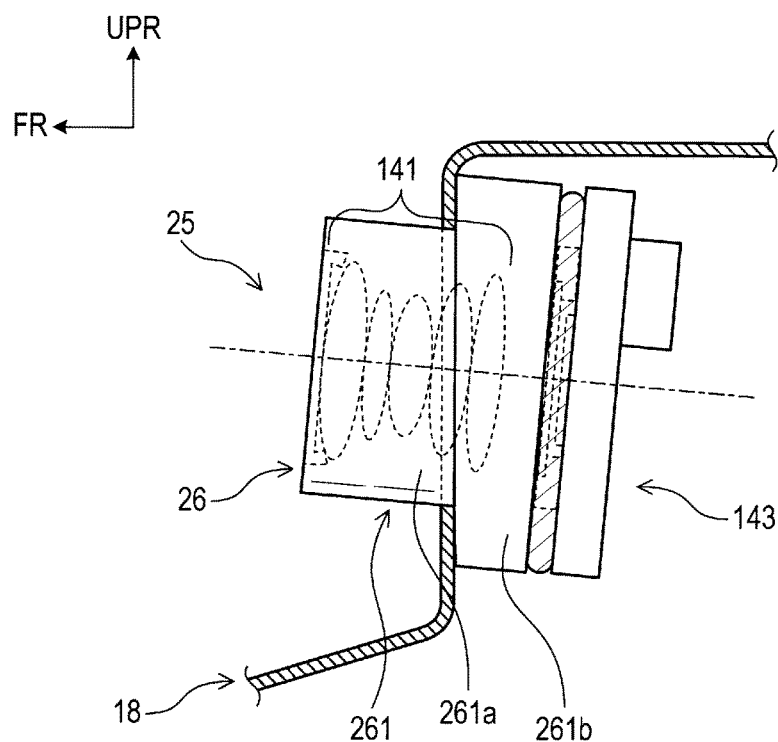
FIG. 13 is a partial enlarged view of a camera apparatus of a fourth embodiment.

In a camera apparatus 25 of the fourth embodiment shown in FIG. 13, the inclination angle of the optical axis of the lenses 141 in the vertical direction with respect to the windshield is adjusted with the shape of a camera module 26 described later. The camera module 26 is one of the plural types of camera modules having different shapes. Using an appropriate one of the plural types of camera modules having different shapes can adjust the inclination angle. According to the different shapes, the inclination angles of the optical axis of the lenses in the vertical direction with respect to the windshield differ from each other in a state where the camera apparatus is mounted on the windshield.

Specifically, the camera apparatus 25 of the fourth embodiment differs from the camera apparatus 11 of the first embodiment in that the camera apparatus 25 includes the camera case 18 of the second embodiment and a camera module 26 whose shape is partially different from that of the first embodiment, instead of the camera case 13 and the camera module 14 of the first embodiment.

The camera module 26 of the fourth embodiment includes a holder 261, the lenses 141, and a camera board 143.

The holder 261 includes a cylinder 261a and a base 261b, which does not have the projections 142c and 142d of the first embodiment as in the case of the holder 191 of the second embodiment. The camera case 18 and the camera module 26 are fixed to each other by using screws.

In addition, in the holder 261, the base 261b has a shape different from that of the holder 142 of the first embodiment (and that of the holder 191 of the second embodiment). That is, although the base 142b of the first embodiment has a shape (rectangular shape) having a constant thickness when viewed in the lateral direction (horizontal direction), the base 261b has a shape (trapezoidal shape) whose thickness gradually increases upward when viewed in the lateral direction. The central axis of the cylinder 261a (i.e. the optical axis of the lenses 141) is perpendicular to a surface with which the camera board 143 of the base 261b is brought into contact. Hence, according to the holder 261 of the fourth embodiment, the inclination angle of the optical axis of the lens 141 with respect to the windshield is adjusted so as to be larger than that of the configuration in which the thickness of the base is constant, in a state where the camera apparatus 25 is mounted on the windshield.

[Advantages]

Figure 14:
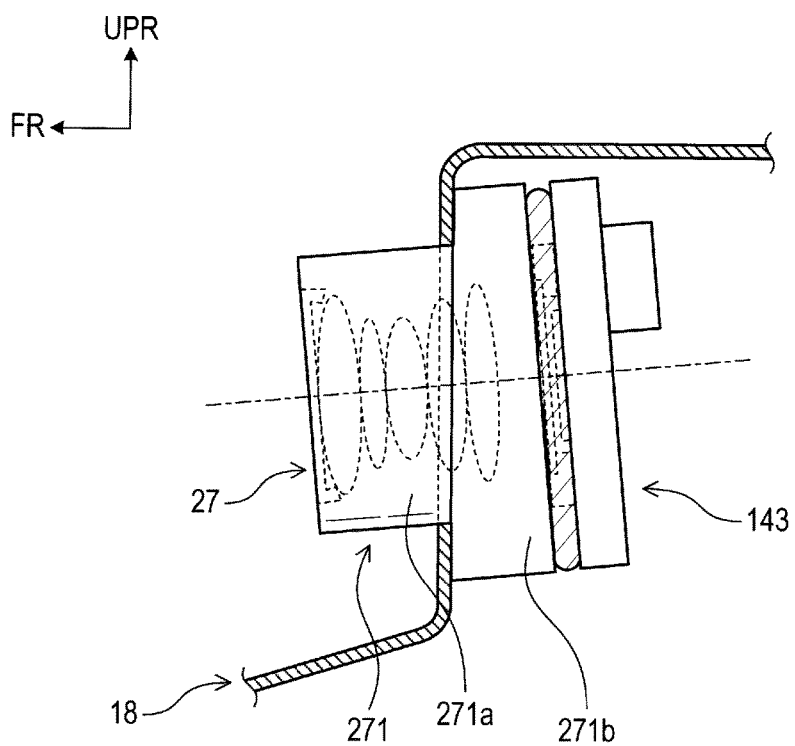
FIG. 14 is a partial enlarged view of a camera apparatus of a modification of the fourth embodiment.

In the camera apparatus 25 of the fourth embodiment, the inclination angle of the optical axis of the lenses 141 with respect to the windshield is adjusted so as to be larger than that of a case where the thickness of the base of the holder is constant. However, the inclination angle of the optical axis of the lenses 141 with respect to the windshield may be adjusted so as to be smaller as shown in FIG. 14. In FIG. 14, instead of the camera module 26, another type of camera module 27 is used. A holder 271 configuring the camera module 27 includes a cylinder 271*a* and a base 271*b*, which has a shape whose thickness gradually increases downward when viewed in the lateral direction. Hence, the inclination angle of the optical axis of the lenses 141 with respect to the windshield is adjusted so as to be smaller than that of a case where the thickness of the base of the holder is constant.

Fifth Embodiment

Differences from First Embodiment

In the fifth embodiment below, since the basic configuration is similar to that of the first embodiment, the description of the configuration common to that of the first embodiment is omitted, and the differences from the first embodiment will be mainly described. The components identical with or similar to those of the first embodiment are given the same reference numerals.

Figure 15:
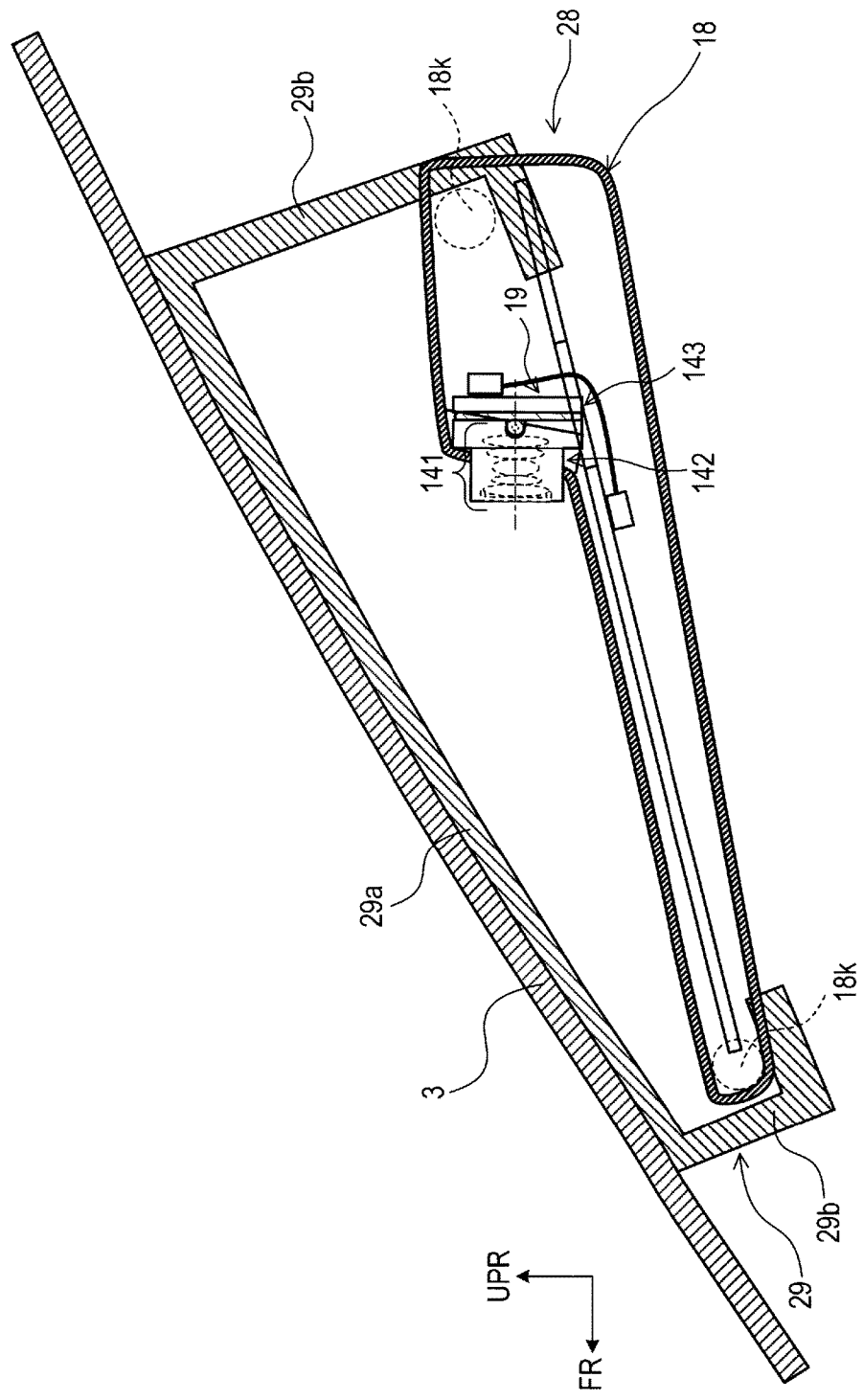
FIG. 15 is a schematic cross-sectional view of a camera apparatus of a fifth embodiment.

In a camera apparatus 28 of the fifth embodiment shown in FIG. 15, the inclination angle of the optical axis of the lenses 141 in the vertical direction with respect to the windshield 3 is adjusted with the shape of a bracket 29 described later. The bracket 29 is one of the plural types of brackets having different shapes. Using appropriate one of the plural types of brackets having different shapes can adjust the inclination angle. According to the different shapes, the inclination angles of the optical axis of the lenses in the vertical direction with respect to the windshield differ from each other in a state where the camera apparatus is mounted on the windshield.

Specifically, the camera apparatus 28 of the fifth embodiment differs from the camera apparatus 11 of the first embodiment in that the camera apparatus 28 includes the bracket 29 whose shape is partially different from that of the first embodiment, and the camera case 18 and the camera module 19 of the second embodiment, instead of the bracket 12, the camera case 13, and the camera module 14 of the first embodiment.

The bracket 29 includes a top board 29*a* and four L-shaped hooked portions 29*b*. The top board 29*a* is subject to adhesion (adheres) to the windshield 3. Two of the four hooked portions 29*b* stand at one end in the horizontal direction of the under surface of the top board 29*a*. The other two of the four hooked portions 12*b* stand at the other end in the horizontal direction of the under surface of the top board 12*a*. The difference between the length (height) in the vertical direction of the two hooked portions 29*b* at the rear side and the length (height) in the vertical direction of the two hooked portions 29*b* at the front side is larger than that of the bracket 12 (see FIG. 1) of the first embodiment. Hence, in a case where the bracket 29 of the fifth embodiment and the bracket 12 of the first embodiment are used for the windshields having the same inclination angle, the inclination angle of the optical axis of the lenses 141 becomes larger when the bracket 29 of the fifth embodiment is used than when the bracket 12 of the first embodiment is used. Hence, by using the bracket 29 of the fifth embodiment for the windshield 3 of the fifth embodiment having an inclination angle larger than that of the windshield 2 of the first embodiment, the optical axis of the lenses 141 is adjusted to be a predetermined direction (horizontal direction in the present embodiment).

Other Embodiments

It will be appreciated that the present invention is not limited to the configurations described above, but any and all modifications, variations or equivalents, which may occur to those who are skilled in the art, should be considered to fall within the scope of the present invention.

(1) The structure for adjusting the inclination angle in the vertical direction of the optical axis of the lenses 141 with respect to the windshield is not limited to the above embodiment.

In the third embodiment, a structure for adjusting the inclination angle with the shape of the camera case 23 is exemplified. Specifically, in the camera case 23 of the third embodiment, the inclination angle is adjusted with the angle of the standing planar part 23*c* with respect to the rear planar part 23*d*. However, the inclination angle may be adjusted with a shape of another part of the camera case. For example, the angle may be adjusted in a state where the cross-sectional shape viewed in the lateral direction of a wall having a standing planar part of the camera case (i.e. a wall that contacts an outer surface of the front side of the camera module) is not a rectangular shape but a trapezoidal shape (whose thickness gradually increases upward or downward). In addition, for example, the angle may be adjusted with a relative positional relation between the two latch parts at the front side and the two latch parts at the rear side of the four latch parts provided to the right and left external side surfaces of the camera case.

Figure 16:
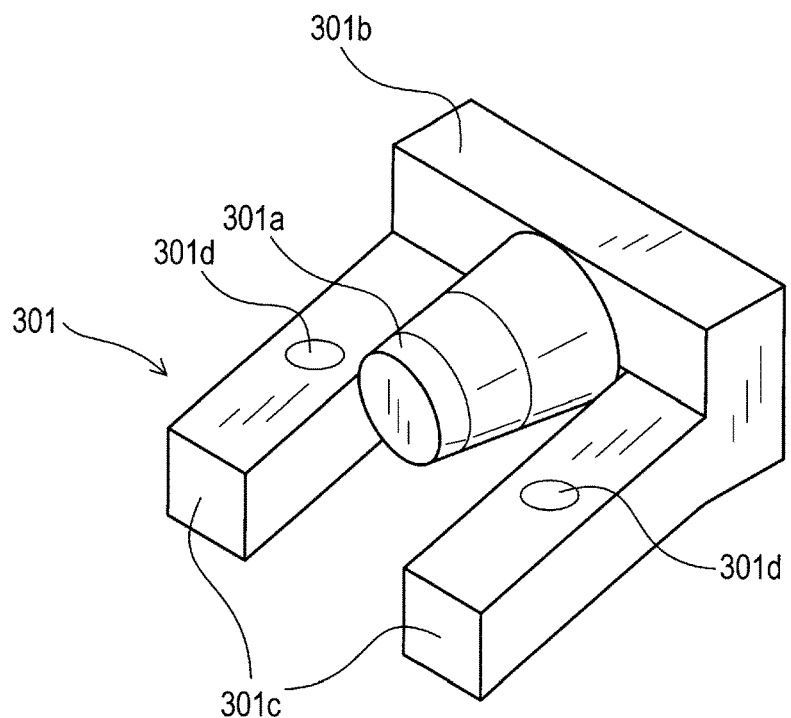
FIG. 16 is a perspective view of a holder of a modification.
Figure 17:
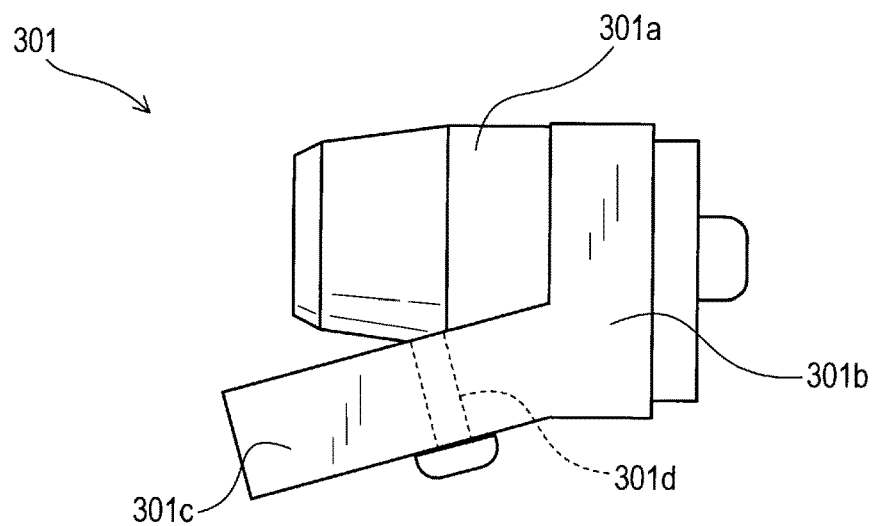
FIG. 17 is a side view of a holder of a modification.
Figure 18:
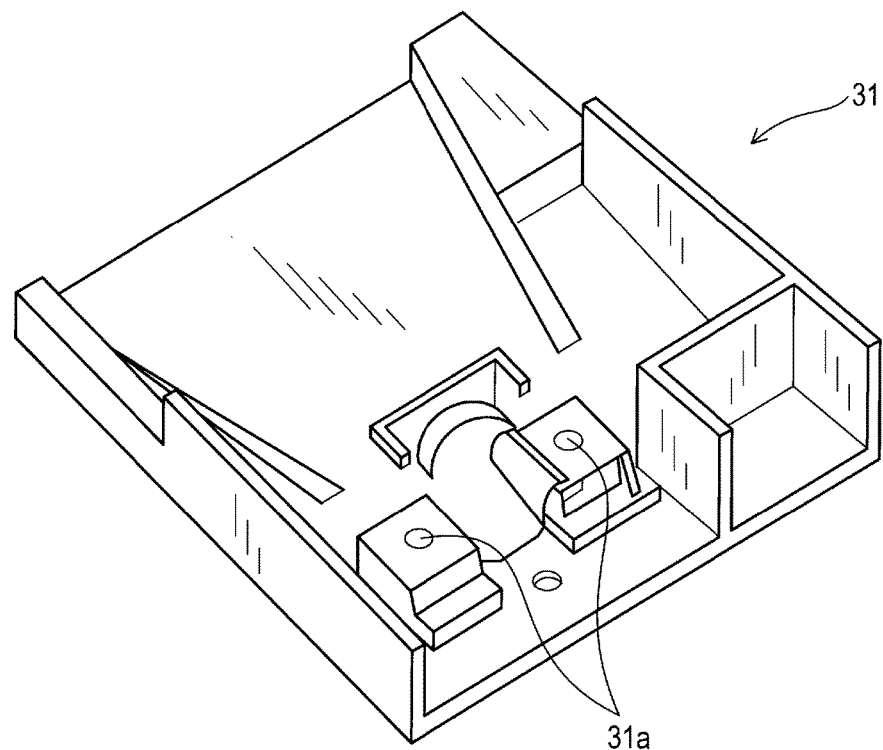
FIG. 18 is a perspective view of a camera case of a modification viewed from below.

In the fourth embodiment, a structure for adjusting the inclination angle with the shape of the camera module 26 (holder 261) is exemplified. Specifically, in the camera module 26 of the fourth embodiment, the inclination angle is adjusted with the shape of the base 261*c* viewed in the lateral direction. However, the inclination angle may be adjusted with a shape of another part of the camera case (holder). For example, a holder 301 shown in FIG. 16 and FIG. 17 includes two forward protruding portions 301*c* projecting in the anterior direction from an outer surface of the front side of a base 301*b*. Each of the forward protruding portions 301*c* is provided with a through-hole 301*d* penetrating the forward protruding portion 301*c* in the vertical direction. Inserting bolts into the through-holes 301*d* and through-holes 31*a* formed in the camera case 31 shown in FIG. 18 can fix the holder 301 to the camera case 31. According to this structure, the inclination angle in the vertical direction of the optical axis of the lenses 141 with respect to the windshield is adjusted with the inclination angle in the vertical direction of the forward protruding portions 301*c* with respect to the base 301*b*. Specifically, using an appropriate one of the plural types of holders (camera modules) having different inclination angles in the vertical direction of the forward protruding portions 301*c* with respect to the base 301*b* adjusts the inclination angle.

(2) In the above embodiments, an adjustment structure for fixing the camera module 14 to the camera case 13 so as to be rotatable, an adjustment structure using the shim 20, and the like are exemplified. However, the adjustment structures are not limited to be used separately but may be used so that at least two of the adjustment structures are used in combination.

(3) In the first embodiment, the concave portions 13*n* and 13*o* formed in the camera case 13 as a rotation holding section are exemplified. However, in a structure in which a concave portion is formed in an external side surface of a camera module (e.g. holder), the rotation holding section may be a projection formed on an internal side surface of the camera case, and may be inserted into the concave portion to hold the camera module so as to be rotatable.

(4) In the first embodiment, in the application step of an adhesive, in a state where the holder 142 is mounted on the camera case 13, the adhesive is applied from the rear of the holder 142, and the camera board 143 is disposed on the rear of the holder 142 on which the adhesive is put. That is, the adhesive is applied between the holder 142 and the camera board 143 after being applied between the holder 142 and the camera case 13. However, the order of applying an adhesive is not limited to this. The adhesive may be applied between the holder 142 and the camera case 13 after being applied between the holder 142 and the camera board 143.

(5) In the second to fifth embodiments, the camera cases 18 and 23 and the holders 191 and 261 are fixed to each other by using screws. However, the camera cases 18 and 23 and the holders 191 and 261 may be fixed to each other by using an adhesive or the like. In the above embodiments, the holders 191 and 261 and the camera board 143 are fixed to each other by using an adhesive. However, the holders 191 and 261 and the camera board 143 may be fixed to each other by using screws or the like.

(6) In the above embodiments, the mark of the label 13p indicates the type of the inclination angle of the optical axis of the lens 141 with respect to the camera case 13 in a state where the inclination angle of the optical axis of the lens 141 with respect to the camera case 13 is fixed. The mark may indicate the type (adjustment standard value) of the inclination angle in the vertical direction of the optical axis of the lenses with respect to the camera case to be adjusted in a case where, for example, the angle is adjusted with rotation as in the case of the first embodiment.

In the above embodiments, the mark of the label 13p indicates both the type of the inclination angle of the optical axis of the lens 141 with respect to the camera case 13 and the type of the shape of the hood 82. However, the mark may indicate one of them.

In the above embodiments, the mark of the label 13p is an identification number indicating, for example, the type of the inclination angle of the optical axis of the lens 141 with respect to the camera case 13. However, the mark may have letters, a sign, a bar code, a two-dimensional code (e.g. QR code (registered trademark)) or the like. The mark may have a punctate figure (dots) that has a specific color corresponding to, for example, the type of the inclination angle of the optical axis of the lens 141 with respect to the camera case 13. The mark may have a figure other than dots.

In the above embodiments, the mark is put on the camera cases 13, 18, and 23 by affixing the label 13p on which the mark is printed. However, the mark may be put by ink jet printing, laser marking, or the like.

In the above embodiments, the mark is put on a visible portion of a surface of the camera case 13. However, the mark may be put on a visible portion of a surface of the camera module or the hood. That is, the mark may be put on a visible portion of a surface of the camera apparatus.

Figure 19:
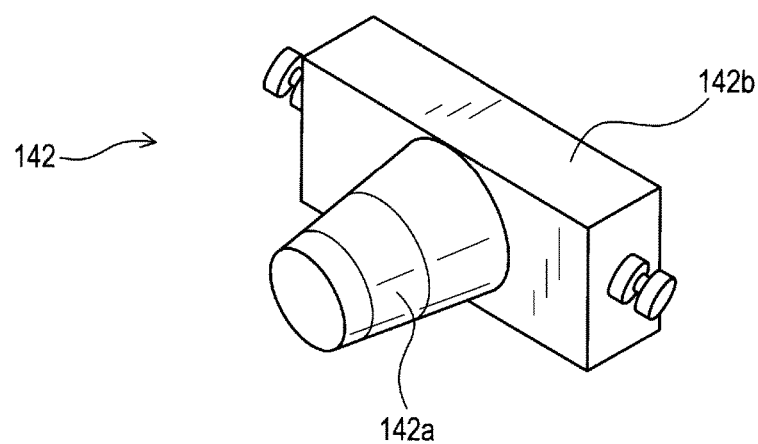
FIG. 19 is a perspective view of a holder of the first embodiment.

In the above embodiments, the type of the inclination angle of the optical axis of the lens 141 with respect to the camera case 13 can be easily identified by providing the mark. However, the type of the inclination angle of the optical axis of the lens 141 with respect to the camera case 13 may be visually displayed with a color of at least one material of the camera case, the camera module, and the hood. In this case, in the holder 142 of the first embodiment shown in FIG. 19, the type of the inclination angle of the optical axis of the lens 141 may be displayed with a color of the material of the front part of the cylinder 142a. Alternatively, in the holder 301 (see FIG. 16 and FIG. 17), the type of the inclination angle of the optical axis of the lens 141 may be displayed with a color of the material of the front part of a cylinder 301a.

The type of the inclination angle of the optical axis of the lens 141 may be displayed with not one of the colors and the marks of the components and the members such as the holder but both of them.

(7) In the above embodiments, part of the camera modules 14, 19, 26, and 27 is inserted into the opening 80a of the signal processing board 80. However, the whole of the camera modules 14, 19, 26, and 27 may be inserted.

(8) Functions of one element of the embodiments may be divided into a plurality of elements. Functions of a plurality of elements may be integrated into one element. At least part of the configurations of the embodiments may be replaced with a known configuration having similar functions. Part of the configurations of the embodiments may be omitted. At least part of the configurations of the embodiments may be added to the other embodiment. At least part of the configurations of the embodiments may be replaced with part of the configuration of the other embodiment.

Hereinafter, an aspect of the above-described embodiments will be summarized.

As an aspect of the embodiments, a camera apparatus is provided which includes at least one bracket (12, 29), at least one camera case (13, 18, 23, 24, 31), and at least one camera module (14, 19, 26, 27). The bracket is fixed to a windshield (2, 3) of a vehicle from a vehicle interior side. The camera case is fixed to the bracket. The camera module is fixed to the camera case and includes a lens (141). The camera apparatus detects a position of objects present ahead of the vehicle. The object may include lanes and other vehicles. Information on the objects acquired by the camera apparatus is used for at least one of lane departure alarm control, light control, and collision avoidance control. The camera apparatus further includes an adjustment structure for completing adjustment of an inclination angle in a vertical direction of an optical axis of the lens with respect to the windshield by the time when the camera case is completely fixed to the bracket. Since the camera apparatus described above does not have a structure by which the inclination angle thereof can be adjusted after being attached to the windshield, the camera apparatus can be produced inexpensively.

What is claimed is:
1. A camera apparatus comprising:
at least one bracket that is fixed to a windshield of a vehicle from a vehicle interior side;
at least one camera case that is fixed to the bracket; and
at least one camera module that is fixed to the camera case and includes a lens, wherein
the camera apparatus detects a position of an object present ahead of the vehicle,
the object includes a lane and another vehicle,
information on the object acquired by the camera apparatus is used for at least one of lane departure alarm control, light control, and collision avoidance control,
the camera apparatus further comprises an adjustment structure for completing adjustment of an inclination angle in a vertical direction of an optical axis of the lens with respect to the windshield by the time when the camera case is completely fixed to the bracket, the camera case is provided with a rotation holding section that holds the camera module so as to rotate with respect to the camera case, at least part of the adjustment structure is configured by the rotation holding section, the camera module is fixed to the camera case in a state where the inclination angle in the vertical direction of the optical axis is adjusted by the rotation holding section, the camera module includes a holder holding the lens and a camera board on which an image sensor is mounted, the holder and the camera board have shapes whose relative position is adjusted in a state where the holder and the camera board are joined to each other, the rotation holding section holds the holder so as to rotate with respect to the camera case, the holder and the camera case are fixed to each other with an adhesive, the holder and the camera board are fixed to each other with an adhesive, and the adhesive fixing the holder and the camera case to each other and the adhesive fixing the holder and the camera board to each other are connected to each other.

2. The camera apparatus according to claim 1, further comprising a shim for adjusting the inclination angle in the vertical direction of the optical axis to configure at least part of the adjustment structure, the shim being provided between the camera case and the camera module.

3. The camera apparatus according to claim 1, wherein the camera apparatus comprises one of the plural types of camera cases whose shapes are different from each other whereby the inclination angle in the vertical direction of the optical axis is changed, in a state where the camera apparatus is mounted on the windshield, to configure at least part of the adjustment structure.

4. The camera apparatus according to claim 1, wherein the camera apparatus comprises one of the plural types of camera modules whose shapes are different from each other whereby the inclination angle in the vertical direction of the optical axis is changed, in a state where the camera apparatus is mounted on the windshield, to configure at least part of the adjustment structure.

5. The camera apparatus according to claim 1, wherein the camera apparatus comprises one of the plural types of brackets whose shapes are different from each other whereby the inclination angle in the vertical direction of the optical axis is changed, in a state where the camera apparatus is mounted on the windshield, to configure at least part of the adjustment structure.

6. The camera apparatus according to claim 1, wherein the camera module includes a holder holding the lens and a camera board on which an image sensor is mounted, and the holder and the camera board have shapes whose relative position is adjusted in a state where the holder and the camera board are joined to each other, and are fixed to each other with an adhesive.

7. A camera apparatus comprising:
at least one bracket that is fixed to a windshield of a vehicle from a vehicle interior side;
at least one camera case that is fixed to the bracket;
at least one camera module that is fixed to the camera case and includes a lens; and
a hood, wherein
the camera apparatus detects a position of an object present ahead of the vehicle,
the object includes a lane and another vehicle,
information on the object acquired by the camera apparatus is used for at least one of lane departure alarm control, light control, and collision avoidance control,
the camera apparatus further comprises an adjustment structure for completing adjustment of an inclination angle in a vertical direction of an optical axis of the lens with respect to the windshield by the time when the camera case is completely fixed to the bracket,
a top surface of the camera case includes a plurality of surfaces having different inclination angles,
the lens is disposed in the vicinity of one of the plurality of surfaces which is close to the windshield,
the camera apparatus includes a signal processing board that processes an image signal acquired by the camera module,
a camera board included in the camera module and the signal processing board are disposed so as to cross each other at an angle,
the signal processing board is provided with an opening into which at least part of the camera module is inserted,
the plurality of surfaces include a first surface that is positioned in front of the camera module in a front-rear direction of the vehicle, a second surface that extends upward from a rear end of the first surface, and a third surface that extends rearward from an upper end of the second surface,
the first surface has a recess, and
the hood has a portion, which corresponds to the recess of the first surface, and is nested into the recess of the first surface.

8. A method for producing a camera apparatus that is attached to a windshield of a vehicle, the camera apparatus including a holder holding a lens, a camera board on which an image sensor is mounted, and a camera case, the method comprising the steps of:
applying an adhesive continuously between the holder and the camera case and between the holder and the camera board which have shapes for adjusting a relative position between the holder and the camera board in a state where the holder and the camera board are joined to each other,
adjusting, after the application, orientation of the holder with respect to the camera case and a relative position between the holder and the camera board by a rotation holding section, which is a part of the camera case, for holding the holder so as to rotate with respect to the camera case, and
fixing, after the adjustment, the holder and the camera case to each other and the holder and the camera board to each other by hardening the adhesive.

* * * * *